2,847,056
METHOD AND APPARATUS FOR PRODUCING REINFORCED SHEET MATERIAL

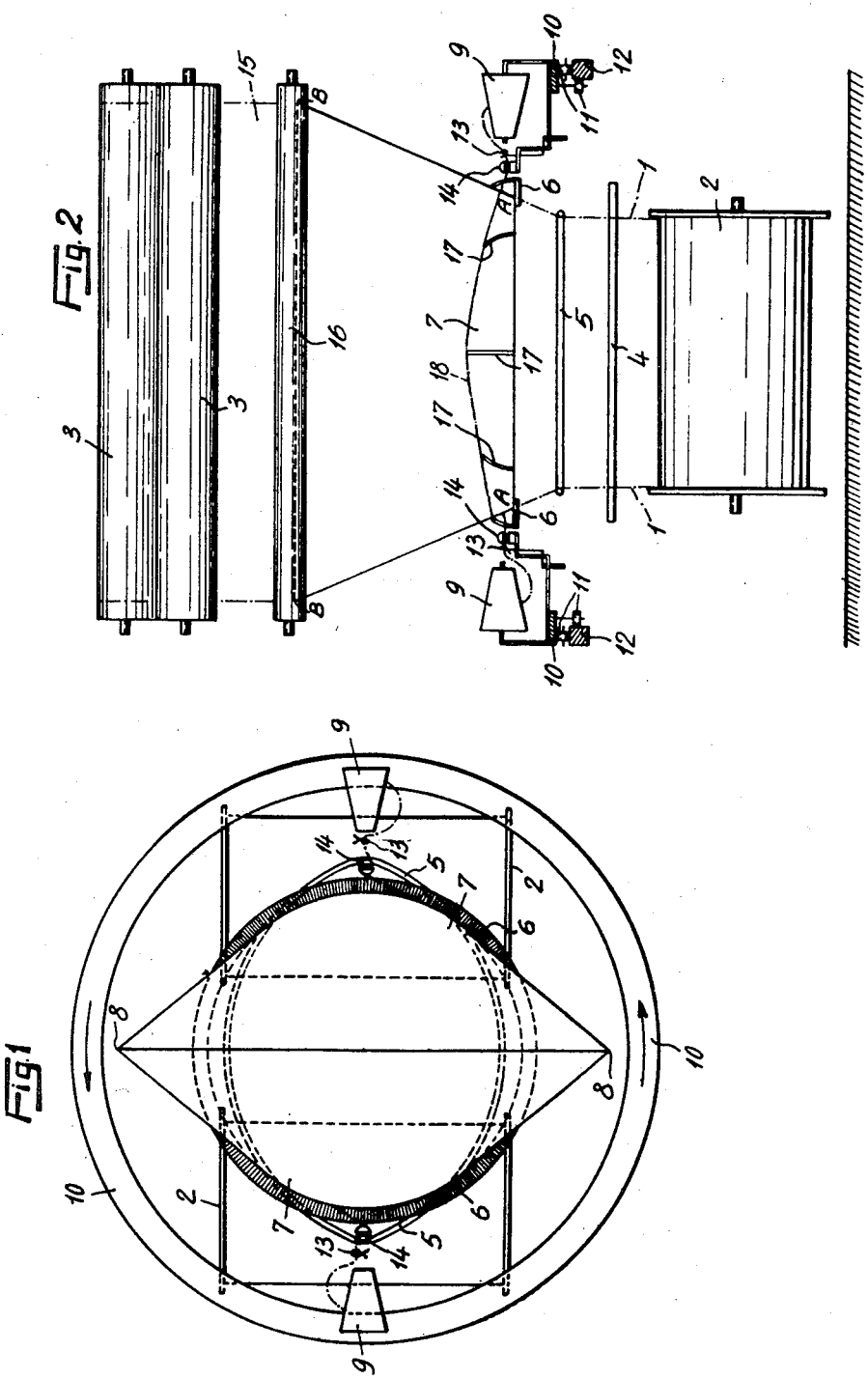

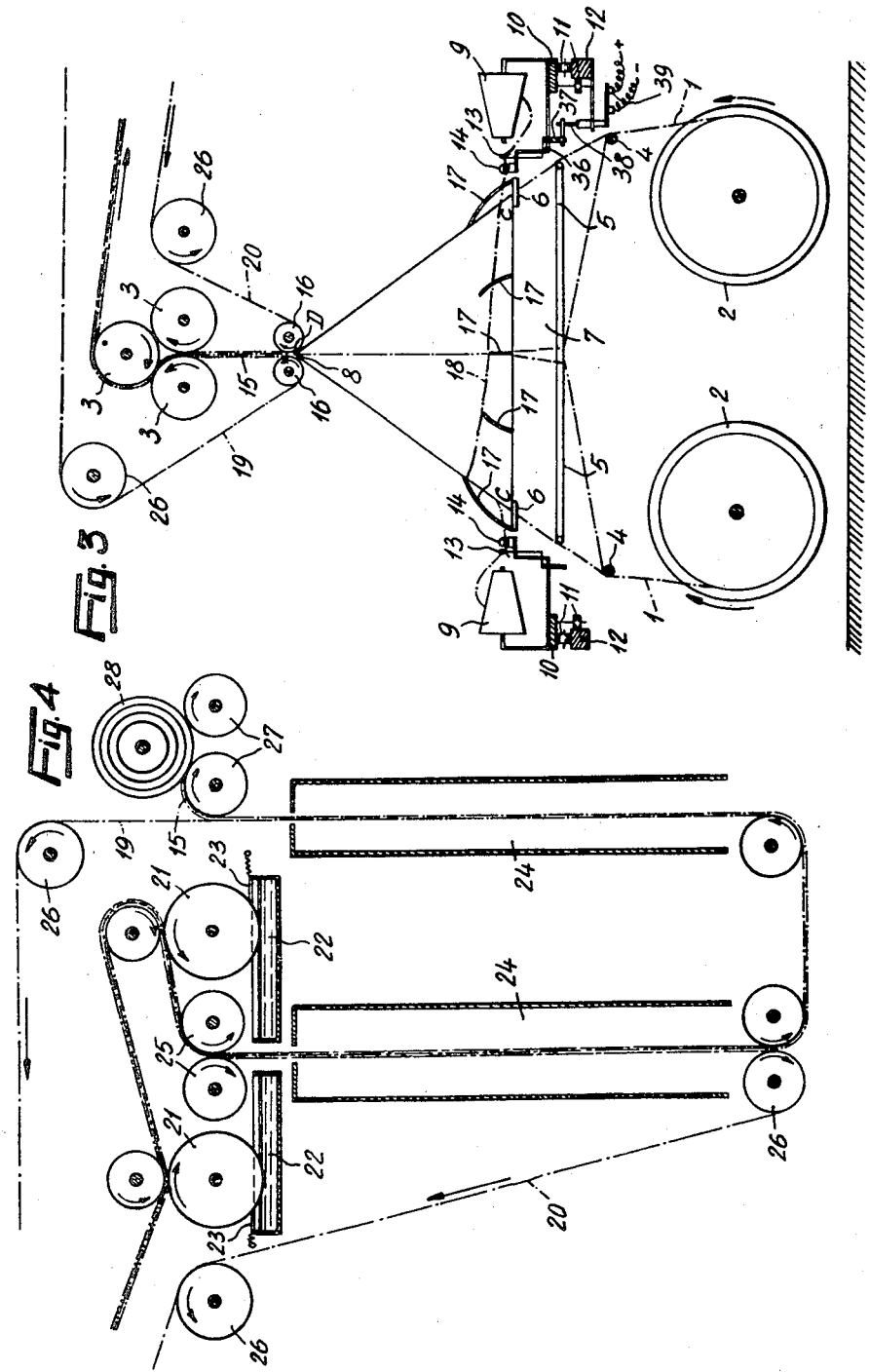

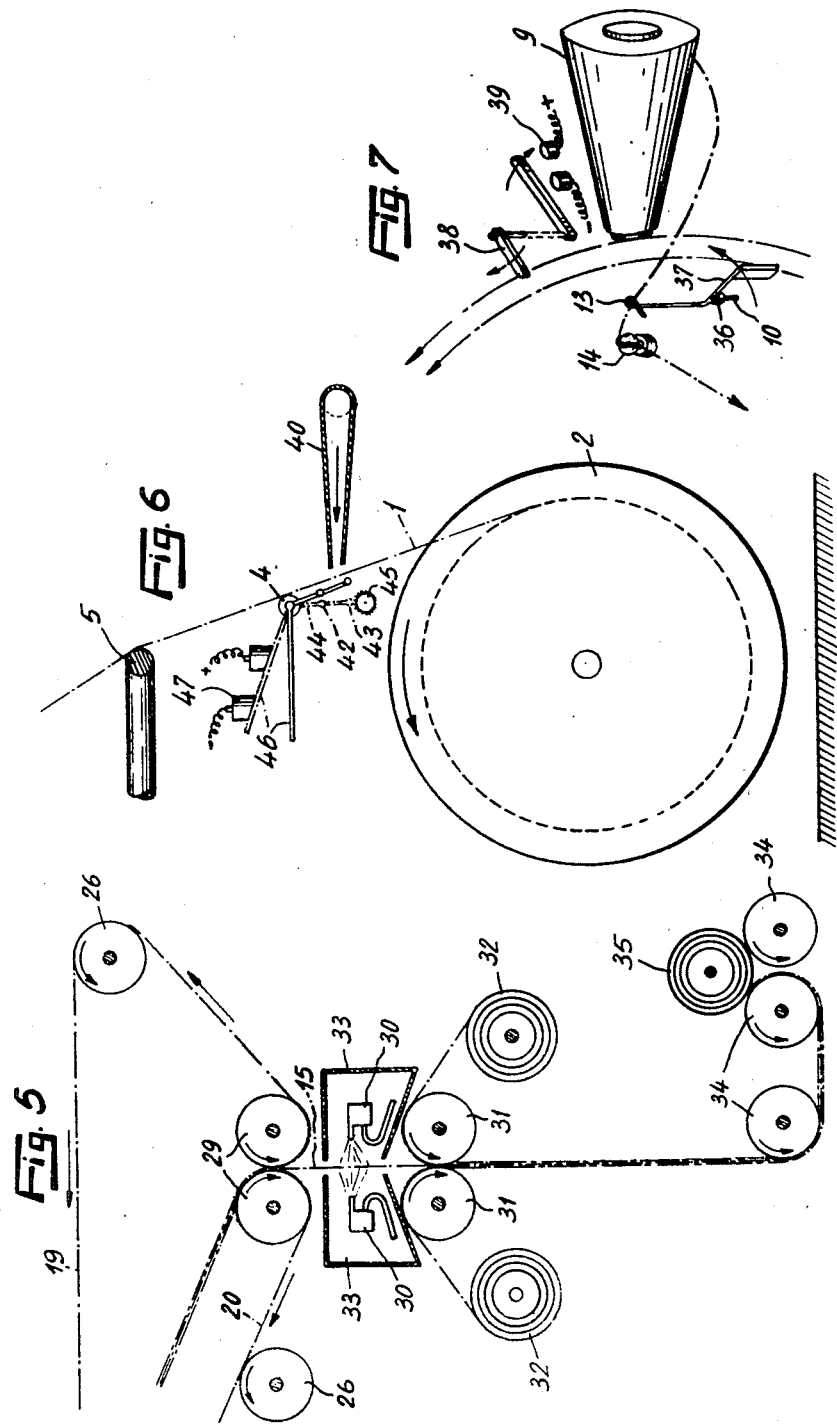

Pierre Georges Emile Auguste Vanlaer, Paris, France
Application February 20, 1956, Serial No. 566,731
Claims priority, application France February 25, 1955
15 Claims. (Cl. 154—1.7)

The present invention relates to a process and to apparatus for the simultaneous and continuous manufacture of a flexible sheet of laminated plastic material, of its reinforcement by rovings or threads which are not woven but which are orientated perpendicularly or at a predetermined angle relatively to one another and as a result impart to the sheet a bidirectional resistance as well as a dimensional stability superior to those of the sheets reinforced by a fabric, and of its external covering formed by applying to its surfaces, layers of various materials suitable for the use to which the sheet is to be applied.

Processes and apparatus are already known by which it is possible to produce sheets of plastic material, reinforced either by layers of fibres, or by orientated or non-orientated threads or rovings, or even by reinforcements consisting of rovings or threads which have been previously woven or interlaced without weaving.

Processes and apparatus are also known by which it is possible to produce plastic tubes reinforced by a layer of rovings or threads which are not woven but which are spirally wound around a central detachable core after having been previously coated with an adhesive material.

Processes and apparatus are also known by which it is possible to produce tubular assemblies of unwoven rovings or threads by winding turns of transverse threads around longitudinal threads previously coated with an adhesive material and disposed against the flat surfaces of a fixed support of polygonal cross-section, the corners of the tubular assembly in polygonal form which is thus obtained being opened by knives in order to form flat sheets of adhesively bonded threads or rovings, the width of which cannot exceed that of the surfaces of the polygonal support.

In another apparatus, based on the same principle, the turns or helices of transverse threads are wound around longitudinal threads which are previously coated and disposed around a fixed circular support, the tubular product thus obtained being opened by a knife and unfolded to form a flat sheet of adhesively bonded threads.

In the majority of known apparatus, a rotatable annular creel winds the transverse threads around the longitudinal threads previously coated with adhesive material, the assembly of adhesively bonded threads thus obtained being of tubular form.

Unlike the known processes referred to above, the process according to the invention is essentially characterized in that the reinforcement, the plastic sheet and the external covering are manufactured in successive phases of a single continuous operation.

According to another feature of the invention, the reinforcement is in the form of a sheet obtained by advancing rovings or longitudinal threads in the direction of their length along a guide surface formed at the inlet end substantially by the envelope of a circular cylinder and degenerating progressively towards the outlet end into the envelope of a substantially flattened cylinder conforming to a straight edge, the circumferential length of the outlet end being substantially equal to that at the inlet end, and by winding transverse rovings or threads in sinusoidal turns of variable pitch around the said longitudinal rovings or threads at a position where the longitudinal rovings or threads still follow a path formed substantially by the generatrices of the said circular cylinder.

According to another feature of the invention, the guide surface for the longitudinal rovings or threads is shaped in such manner as to cause a drawing or stretching of the sinusoidal turns or helices as the sheet formed of longitudinal and transverse threads is advanced, resulting in the displacement of said turns in relation to the longitudinal threads and their alignment into straight half turns.

According to another feature of the invention, the relative positions of the longitudinal and transverse threads forming the reinforcing sheet are maintained, when the sheet is conveyed for subsequent treatments, by a clamping action preferably exerted by the conveying means, which may for example be conveyor belts made of fabric, layers of threads, fibres or the like, applied to the two surfaces of the said sheet and travelling with the latter.

According to another feature of the invention, the impregnation of the sheet of longitudinal and transverse threads with the plastic or other material is effected through the means for conveying the said sheet. The conveying means may be adapted either to remain incorporated in the final product or alternatively to be separated from the latter after drying the plastic material.

According to another feature of the invention, the texture of the conveying means (fabric or other materials) serves to impart a graining to the two surfaces of the plastic sheet.

According to another feature of the invention, the impregnation of the sheet of longitudinal and transverse threads with the plastic material is effected after the said sheet has been separated from the conveying means.

According to another feature of the invention, the sheet of longitudinal and transverse threads is covered on one or both surfaces thereof with a sheet or sheets of solid thermoplastic material fixed on the reinforcing sheet by heat or electronic welding.

According to another feature of the invention, the sheet of longitudinal and transverse threads is covered on both its surfaces, after impregnation with the plastic material but before drying the latter, with an impermeable film resisting the drying of the plastic material and for this reason being adapted to be subsequently separated from the said sheet.

According to another feature of the invention, the sheet of longitudinal and transverse threads is lined, after impregnation with the plastic material but before the drying of the latter, and on one or both surfaces thereof, with layers or sheets, the said layers or sheets being incorporated into the plastic sheets by the drying of the impregnating plastic material. The layers or sheets may be layers of hair, orientated or non-orientated fibres, felts or fabrics.

According to another feature of the invention, the sheet of longitudinal and transverse threads is covered, after impregnation with the plastic material but before drying the latter, and on one or both surfaces thereof, with hairs disposed perpendicular to the said sheet, the hairs being stuck beforehand by one end to a support of any suitable material by means of an adhesive which can easily be removed, and separating them from their support when the drying of the plastic material has caused their other ends to adhere to the plastic sheet.

According to another feature of the invention, the shee of longitudinal and transverse threads impregnated with plastic material is converted into a plastic sheet by drying the impregnating plastic material by heating, air treatment or cooling, depending on the nature of the said material. The longitudinal and transverse rovings or threads, the plastic material and the various materials forming the external coverings of the plastic sheet may be colored or dyed.

Further according to the invention there is provided apparatus for carrying into effect the process referred to above, the apparatus comprising a station for the formation of the reinforcement constituted by a sheet of crossed threads, a station for impregnating the said sheet with plastic or other material, and a drying station for the sheet of threads impregnated with plastic material, the said stations being traversed in succession and continuously by the product as it is being manufactured, and conveying means adapted to convey the said product from one station to the following station.

According to another feature of the invention, the station for forming the reinforcing sheet comprises a fixed guiding support shaped at its inlet end substantially according to the envelope of a circular cylinder and progressively becoming flattened towards its outlet end in such a manner as to have at this end substantially the form of a straight edge parallel to the plane containing the base of the circular cylinder at the inlet end, the width of the flattened portion being equal to half the circumference of the said base, means by which the threads or rovings coming under tension from creels or loom beams are adapted to be distributed around the said base and by which the said threads or the like from the said edge are drawn in the form of a sheet of parallel threads, means by which the transverse rovings or threads coming from bobbins, cops or cones carried by a rotatable annular creel are wound into sinusoidal turns or helices around the said longitudinal threads or rovings at a position disposed in proximity to the said base of the fixed guiding support, means by which the winding pitch of the said sinusoidal turns are caused to vary, and means by which the tension of the said transverse threads is adapted to be varied and by which the said sinusoidal turns wound close to the entrance base of the said guiding support are transformed into straight and parallel half turns at the outlet end.

According to another feature of the invention, there is provided means for ensuring the transport of the product being manufactured from the station where the reinforcement is formed to the impregnating station, and from the latter to the drying station, the said means comprising either endless conveyor belts, or belts of a predetermined length unwound from and wound on to storage drums, or layers of fibres or threads.

According to another feature of the invention, the conveying means are pervious to the impregnating material and to the drying fluid.

According to another feature of the invention, the station for forming the reinforcing sheet includes a safety device adapted to stop the machine in the event of one of the longitudinal threads breaking, the said device comprising a movable contact element adapted to be actuated by the piece of broken thread, a movable member with a gripping action such as a rotating roller with a rough surface, and a blower device directing a current of air on to the longitudinal threads and urging the latter in a direction bringing them to the range of the said gripping member, the arrangement being such that a slack or broken longitudinal thread is, in operation, brought by the said air current to the region of said gripping member and held by the latter, the thread thus placed under tension then acting on the said movable contact member in such manner that the latter causes the stoppage of the machine.

According to another feature of the invention, the station for forming the reinforcing sheet includes a safety device adapted to stop the machine in the event of one of the transverse threads breaking, the said device comprising a movable contact member mounted on the said rotatable annular creel carrying the bobbins or the like supplying the said transverse threads, the said movable contact member being subjected to the pull exerted on the one hand by a transverse thread and on the other hand by centrifugal force, the arrangement being such that when the thread in question breaks, the movable contact member is brought by centrifugal force in to a position in which it causes the machine to stop.

Some embodiments of the invention will now be described by way of example with reference to the accompanying drawings, in which:

Figure 1 is a diagrammatic plan view of the part of the apparatus which is called the "textile station" in the following description;

Figure 2 is a diagrammatic front elevation partly in section, of the same textile station;

Figure 3 is a diagrammatic transverse section of the same textile station;

Figure 4 is a diagrammatic transverse section of the part of the apparatus referred to as the "impregnating station" in the following description; this part of the apparatus illustrated by way of example is of the roller type and comprises drying members;

Figure 5 is a diagrammatic transverse section of an impregnating station operating by atomization of a liquid, also illustrated by way of example;

Figure 6 is a diagrammatic perspective view of a centrifugal safety device adapted to stop the machine when a transverse thread breaks; and Figure 7 is a diagrammatic transverse section of an electro-pneumatic safety device adapted to stop the machine when a longitudinal thread breaks.

In Figures 1, 2, 3 and 6, the longitudinal threads coming from two conventional loom beams equipped with negative or positive unwinding members are drawn by the drums 3, travel over the bar 4 of an electro-pneumatic stop motion device and around the periphery of an elliptical guide 5, either on the inside or the outside, depending on the position which they occupy on each of the beams.

Notches formed on the periphery of this elliptical guide 5 prevent the longitudinal threads from being displaced laterally and distribute the said threads around its periphery in order to enable them to pass without lateral force into the teeth of a circular comb 6.

The teeth of the circular comb 6 are open on the external part thereof in such manner as to avoid the reentry of the threads when setting up a fresh warp and when repairing a broken thread.

The tension of the threads keeps them in the notches of elliptical guide 5 and prevents them from slipping out of the open teeth of the circular comb 6. The spacing of these teeth is such as to distribute the threads in a tubular device around the periphery of a section of a cylinder envelope 7, the said threads progressing along the generatrices of the latter by being drawn along by the winding drums 3.

Starting from this point of travel of the longitudinal threads, the circular shape of the cylinder 7 is gradually modified until its end 8 assumes the shape of a completely flattened cylinder.

At the level of the circular part of the cylinder 7, cones or cops of transverse thread 9 are mounted on a ring 10, the rotation of which, controlled by suitable means, is assured by rollers 11 and a bearing race 12. The transverse threads are guided through the eyelets 13 towards stretchers or tensioning devices 14 carried by the ring 10. These thread-guiding eyelets and also the tensioning devices are of a conventional type. Tensioning devices of the "mushroom" type avoid rubbing of the transverse thread, which is unwinding at high speed.

Each revolution of the ring 10 winds the transverse threads around the longitudinal threads disposed in tubular formation and around the circular part of the cylinder 7 in a succession of turns or spirals, the number of which is a function of the number of cones or cops carried by the ring 10.

The pitch of these spirals is determined by the relative speeds of rotation of the winding drums 3 and the ring 10. This pitch, and consequently the angle of intersection of the longitudinal and transverse threads, may be brought to the desired value by modifying the ratio of the speeds of rotation of the drums 3 and of the ring 10.

The tension of the transverse threads, adjustable by means of the tensioning devices 14, causes the tubular assembly of longitudinal and transverse threads which progresses along the generatrices of the cylinder 7 under the action of the winding drums 3 to conform gradually to the deformation of the cylinder.

This tubular assembly is thus progressively transformed into a flattened tube which, when it reaches the flat end 8 of the cylinder 7, is compressed into a sheet 15 by the action of pressure rollers 16. In this sheet, the longitudinal threads are disposed inside the flattened spirals of the transverse threads.

If the transverse threads had been wound around the longitudinal threads and around the circular part of the cylinder 7 in spirals strictly parallel to a section of this cylinder, each half-spiral would present the form of an arc on each of the surfaces of the sheet. This is due to the fact that the tubular assembly progresses from the circular end of the cylinder 7 to its flattened end 8, being sectioned parallel to its base along generatrices of unequal length (7A to 8B in Figure 2 and 7C to 8D in Figure 3).

In order to compensate for the consecutive deformation of the spirals, which would cause a dimensional instability of the reinforcement when it is subjected to a transverse tensile stress, guides 17 of unequal length and made of polished metal or a plastic material are disposed at regular intervals around the circular part of the cylinder 7. The difference in their lengths compensates for that of the generatrices of the cylinder along which the tubular assembly is drawn.

The tension of the transverse threads, regulatable by means of the tensioning devices 14, constrains them to slide along the guides 17 before coming into contact with the longitudinal threads, around which the weft spirals 18 are consequently wound in sinusoidal form (Figures 2 and 3).

When the tubular assembly of longitudinal threads and sinusoidal spirals is finally compressed into a sheet 15, each transverse semi-spiral which has been progressively aligned by the gradual deformation of the tubular assembly has the appearance, on each of the surfaces of the sheet, of a straight line which crosses the longitudinal threads at an angle predetermined by the winding pitch of the spirals.

The selvages resulting from the squeezing of the transverse spirals wound under tension around the longitudinal threads are straight and regular, provided that at least two longitudinal threads, referred to as selvage threads, are each disposed along diametrically opposite generatrices joining the circular part of the cylinder 7 to the ends of its flattened part 8 (7A to 8B in Figure 2). The object of these selvage threads is to oppose the narrowing of the sheet 15, the tendency to narrowing being caused by the tension of the transverse spirals between the flattened end of the cylinder 8 and the gripping point of the pressure rollers 16. These selvage threads will preferably be more resistant and thicker than the other longitudinal threads, particularly if the sheet is composed of longitudinal threads which are finer than the transverse threads.

The selvage threads are kept in position on each side of the cylinder 7 by diametrically opposed teeth of the circular comb 6 and, on each side of the flattened part 8 of the cylinder, by small notches formed at each of its ends.

The preceding description enables it to be readily understood that the width of the sheet 15 depends on the diameter of the cylinder 7.

Consequently, the adjustment of this width for a value smaller than the maximum width permitted by the arrangement of the elements of the apparatus is effected by replacing the cylinder 7, the circular comb 6 and the elliptical guide 5 by smaller components, the width of the sheet being equal to:

$$\frac{\text{Diameter of cylinder} \times 3.1416}{2} =$$

half-circumference of cylinder 7

In practice, the width of the sheet 15 will be slightly smaller than the theoretical width thus obtained, as a result of the force exerted by the tension of the transverse spirals between the flattened end of the cylinder 8 and the gripping point of the pressure rollers 16.

Narrow plastic sheets having an unwoven reinforcement, such as tapes or ribbons, can be obtained on an apparatus designed according to the same principles, but of much smaller dimensions.

The beams 2 illustrated in Figures 1, 2 and 3 are only necessary in the case where the longitudinal threads have a certain density. The longitudinal threads of low density or weight, frequently used for the weaving of reinforcing layers of plastics, can be unwound directly from bobbin creels of a conventional type equipped with suitable tensioning devices and placed on either side of the apparatus.

In this case, the threads descend from the creels and enter the apparatus at floor level, the circulation around the apparatus being assured by light bridges straddling the width of the warps.

The textile station described above does not include any members carrying out a reciprocatory movement capable of causing rubbing of the longitudinal threads, such as the slay and the healds of looms.

Consequently, the longitudinal threads which can be used by the apparatus described may have features which would make them unsuitable for weaving.

It is even possible to use longitudinal threads composed of rovings of various textiles which are not oiled or sized.

In order to ensure a satisfactory impregnation of the sheet by the plastic material on the impregnating station hereinafter described, it is moreover essential that the longitudinal and transverse threads do not have any sizing or oiling and have a torsion as weak as that permitted to them by the spinning operations and the requisite resistances. As shown in Figure 3, the pressure rollers 16 compress the sheet 15 between two layers 19 and 20 of a large-mesh fabric which serve as conveyors for the sheet between the textile station and the impregnating station and prevent the transverse spirals from being displaced by the action of the winding drums and subsequent cylinders before they have been coated with the plastic material.

These conveyors may be of the endless type (Figures 4 and 5) or they may consist of pieces of suitable length which are reeled at the same time as the impregnated sheet.

When the impregnation of the sheet of assembled threads is effected through the conveyor fabric, the latter must have meshes which are sufficiently large to permit this impregnation. On the other hand, if it is not intended to be incorporated into the plastic sheet for strengthening the reinforcement thereof, it must be composed of monofilaments of a nature incompatible with the plastic material employed or made incompatible by a suitable treatment in such manner as to avoid the adherence of the conveyor fabric to the plastic sheet and to facilitate the separation thereof.

After having passed between the pressure rollers (Figures 2 and 3), the sheet 15, compressed between the two layers of the conveyor fabric 19 and 20, is drawn by the drums 3 of the textile station, which deliver it to the impregnating station (Figures 4 and 5) which is directly adjoining the textile station (Figure 3).

The plastic material may be applied to the sheet 15 through the meshes of the conveyor fabric by a variety of known means such as cylinders, knives, atomizers, etc., the most suitable method of application depending on the nature of this material and the use to which it is intended to apply the plastic sheet.

The same remark is applicable to the various elements of the impregnating station which may be necessary either for heating or cooling the plastic material before it is applied, or for ensuring a satisfactory impregnation of the sheet of threads assembled by this material, as well as the drying, condensation, vulcanization, polymerization or curing thereof.

A cylinder-type impregnating station equipped with a drying and vulcanizing oven suitable for the application of various plastic materials and particularly of latex emulsions is shown by way of example in Figure 4.

The sheet 15, gripped between the two layers of conveyor fabric 19 and 20, is fed to the drawing cylinders 21 of the impregnating station by the drums 3 of the textile station (Figures 3 and 4).

The two sides of the sheet 15 receive an application of liquid or pasty plastic material 22, the quantity raised by the rotation of the cylinders 21 being limited by the knives 23.

Before the impregnated sheet enters the drying oven 24, the plastic material is compressed into the fibres of the threads forming the sheet by the pressure rollers 25, which in addition remove the surplus liquid (Figure 4).

When the impregnated sheet has been dried sufficiently as the result of passing through the drier 24 in order to obviate all risk of subsequent adhesion, the two layers of the conveying fabric 19 and 20 are detached therefrom and returned to the textile station by means of the cylinders 26, while the impregnated sheet 15 is wound by the cylinders 27, which form from the sheet a roll 28 of suitable length (Figures 4 and 3).

The plastic sheet may be formed with a graining so as to give it the appearance of a woven sheet by regulating the knives 23 (Figure 4) in such a manner as to ensure that an abundant supply of plastic material 22 is applied to both surfaces. The impression of the design of the two layers of the conveying cloth 19 and 20 is formed in the impregnation, the graining varying with the texture of the chosen fabric.

Figure 5 illustrates by way of example an impregnating station which operates by atomization of a liquid and which is suitable for various types of plastic resins, particularly certain resins with a polyester base.

It will of course be possible to equip this station with driers, but the section of the apparatus illustrated is intended for the production of initially impregnated sheets consisting of a reinforcement of unwoven threads impregnated with unpolymerized resin.

These initially impregnated sheets, the use of which by the industry using laminated plastic mouldings seems destined to be developed, are protected on each surface by an impervious film which isolates the resin from the oxygen in the air in order to avoid its premature polymerization as well as any contact, the polyester resin remaining tacky as long as it is not polymerized.

The film, which may consist for example of non-porous "cellophane" or regenerated cellulose, which enables the initially impregnated sheet to be stored easily, is only separated therefrom at the time of use. The initially impregnated sheet is then placed in molds, in which the resin is polymerized, imparting a suitable shape to the sheet.

The sheet 15, as well as the two layers of conveying fabric 19 and 20, is delivered by the drums 3 of the textile station to the winding cylinders 29 of the impregnating station (Figures 3 and 5).

The two layers of conveying fabric 19 and 20 are separated from the sheet by the said cylinders 29 and returned to the textile station by way of the cylinders 26, leaving the sheet 15 exposed to the jet of plastic resin projected by the spray guns 30 (Figures 3 and 5).

In this case, the impregnation does not take place through the meshes of the conveyor fabric and this may consequently be of any desired type. The spray guns 30 are of a conventional type and are each mounted on a reciprocating device such as a slide controlled by an endless chain, by which the said guns are given a reciprocatory motion over the entire width of the sheet 15. Consequently, all points of the two surfaces of this sheet, which is displaced at right-angles to the path of the atomizers, are exposed to the plastic resin jet.

The amount of resin applied in this manner to the sheet 15 is regulated on the one hand by the supply needle of the spray guns and on the other hand by the ratio between their speed of translatory movement and the speed at which the sheet 15 is displaced.

An impervious film coming from the rollers 32 is applied to each surface of the impregnated sheet by pressure rollers 31, the pressure of these rollers also assisting the penetration of the resin into the fibres of the threads forming the sheet.

The pressure rollers 31 as well as the film rollers 32 are protected from the resin spray by a casing 33 in which the spray devices are enclosed.

The assembly formed by the impregnated sheet and the layers of protective film 32 is drawn along by the cylinders 34, which form a roll 35 of suitable length from the said sheet.

Other modifications of the impregnating station may be employed in conjunction with the textile station, the type which is most suitable depending on the ultimate use of the plastic sheet and on the nature of the material from which it is made.

By way of example, a plastic sheet composed of a reinforcement obtained in the manner described above and two impervious films of thermoplastic material welded on to the reinforcement may be obtained on the apparatus described by omitting the liquid spray elements 30 on the impregnating station (Figure 5) and by replacing the two layers of impervious film 32 by rolls of thermoplastic film, the heated pressure rollers 31 of which ensure welding to the reinforcement.

Various composite reinforcements may also be formed on the material previously described so as to impart the required characteristics to the plastic sheet.

By way of example, a reinforcement composed of two suitably thick layers of fibres and a core of unwoven threads compressed into a sheet by the method described above and illustrated in Figures 2 and 3 may be obtained by replacing the two layers of conveying fabric 19 and 20 (Figure 3) by layers of fibres. In this case, the fibre layers are not formed by endless webs, like the two layers of fabric 19 and 20 indicated in the figure, but are formed of pieces of suitable length drawn from rolls disposed on each side of the textile station, compressed at the same time as the sheet 15 of threads united without adhesives, impregnated, dried and rolled into a roll 28 on the impregnating station (Figure 4).

This composite reinforcement is of particular interest for the manufacture of reinforced plastic sheets having a certain thickness (imparted by the fibre layers), and a high bidirectional resistance (imparted by the sheet of united threads). These thick plastic sheets are used in the manufacture of laminated plastic moldings as constitutive parts of thick castings and as heat insulators.

The reinforced plastic sheet obtained by the process forming the subject of the invention may be lined on one of its surfaces or both surfaces with layers of various materials giving it an appearance, a feel or physical characteristics required by the use to which it is to be applied.

For example, it is possible to obtain a plastic sheet formed with a pile and having various characteristics by replacing one or both of the two layers of impervious film 32 (Figure 5) by layers of felt or fabric, by layers of orientated or non-orientated carded or combed fibres, or even by layers of any suitable material serving as a support for short hairs or the like each previously bonded by one end on to the support.

In the latter case, the short and erect hairs or the like are only in contact with the plastic resin impregnating the sheet, the support being on the outside. The said hairs, each having been previously stuck by one end on to the support, by means of an adhesive material which can easily be removed, such as for example a water-soluble gum, the support is detached when the hairs or the like are each stuck by the other end on to the plastic sheet, which has the appearance of a pile fabric, velvet, fur or carpet and may be used by the clothing and furnishing industries.

It is also possible to obtain a reinforced plastic sheet lined with felt on one of its surfaces and adapted to be used as a floor covering of the linoleum type.

By lining the surfaces of the plastic sheet with wool fibers, such as combings, and by perforating the said sheet to make it pervious to air, a material is obtained which can be used for the manufacture of garments.

These examples make it apparent what possibilities are offered by the process forming the subject of the invention.

In order to obtain a plastic sheet having an equal resistance and a constant thickness at all its points, it is essential to provide a device which stops the apparatus, that is to say, the textile station and the impregnating station, in the event of breakage of either a transverse or longitudinal thread of the reinforcement.

Various types of devices adapted to stop the machine in the event of breakage of one of the transverse threads may be used on the textile station and the centrifugal device hereinafter described is only given by way of example. This device (Figures 3 and 7) is formed by thread-guiding eyelets 13 comprising a weighted arm 37 and which are mounted on pivots 36 carried by the ring 10.

The centrifugal force developed by the rotation of the ring 10 tends to throw the weighted arm 37 outwardly, which the tension of the transverse thread passing through the eyelet 13 between the cone 9 and the tensioning device 14 holds towards the inside of the ring.

The weight on the arm 37 is adjustable and permits the centrifugal force exerted on the eyelet to be adjusted to the resistance of the thread and to the required tension.

The disappearance of this tension in the event of the transverse thread breaking, or the cone 9 becoming exhausted, frees the eyelet and its weighted arm 37, which the centrifugal force brings into contact with pivoting arms 38 disposed around the ring on the frame of the textile station.

The pivoting of one of these arms 38 establishes an electric or electronic circuit 39 causing the stoppage of the apparatus.

Various types of devices designed for stopping the machine in the event of one of the longitudinal threads breaking may be used on the apparatus and the electropneumatic device which is described hereinafter is only given by way of example.

This device (Figure 6) is directly controlled by the free end of a broken thread or by a floating thread due to lack of tension.

The threads 1 coming from the beam 2 pass over a bar 4 (Figures 3 and 6).

A powerful current of air, blown through a blast-pipe 40 extending over the entire width of the warp, traverses the tensioned threads.

The free end of a broken thread or the middle portion of a loose thread is driven by the current of air between two small bars 42 and 43 extending over the entire internal width of the warp and carried by the rocker arms 44.

The air current brings the thread into contact with teeth of a roughened lining covering a controlled rotating cylinder 45. The thread is caught by the said teeth and the rotation thereof applies a tensile force to the thread and the members 42 and 43, which causes the arms 44 to rock and the ends 46 thereof to close an electric or electronic circuit 47 causing the apparatus to stop.

The safety devices described above may be combined with a visual or audible signal device drawing the attention of the operator.

This signalling method may be selective, so as to indicate to the operator whether the broken thread is a longitudinal or transverse thread, to which beam or to which creel the broken longitudinal thread belongs and in which section of the sheet of longitudinal threads it is located.

In order to obtain quick stoppage of the rotation of the ring 10, the broken longitudinal thread detector and the broken transverse thread detector may be combined with a device for braking the ring.

From the foregoing description, it will readily be understood that the output of the apparatus is controlled by:

(a) The speed of rotation of the ring 10,
(b) The number of cones of transverse thread, carried by this ring and the dimensions thereof, which must be as large as possible in order to reduce the stopping time,
(c) The winding speed of the drums 3 (Figures 2 and 3), 21 and 27 (Figure 4), 29 and 34 (Figure 5), which in turn depends on the drying speed of the plastic resin and the power of the driers.

As an example, there will be taken a plastic sheet comprising a woven reinforcement imparting to it a bidirectional resistance and requiring twenty longitudinal threads per centimetre as a warp and 20 transverse threads per centimetre as a weft, these being of a predetermined material and size.

A plastic sheet reinforced by an unwoven reinforcement of assembled threads of the same material and size produced by the process and on the apparatus described above will require, in order to meet these specifications, a density of longitudinal threads of 10 threads to a centimetre on each of the two beams or on each of the two creels and a combination of the factors (a), (b) and (c) corresponding to the winding of 10 transverse spirals per centimetre around the longitudinal threads and the circular part of the fixed support 7 (Figures 2 and 3).

These ten spirals wound around the longitudinal threads will impart to the flat reinforcement resulting from the flattening of the tubular assembly a transverse resistance equivalent to that of a woven reinforcement having twenty transverse threads per centimetre, the two halves of the flattened spiral having to be taken into consideration and each semi-spiral being equivalent in resistance to a pick of the same thread.

It will be readily understood that the plastic sheet produced according to the process and with apparatus having the features described above will be of a lower cost price than a plastic sheet strengthened by a reinforcement of previously woven or bonded threads or rovings, than a coated or impregnated fabric which it will be able to replace in all its applications, and than a clothing or furnishing fabric, with the characteristic of which it will be able to compete.

The invention has inter alia the following advantages:

The manufacture of a flat reinforcement formed of unwoven threads of rovings and the production of a pliable sheet of laminated plastic material as well as the application of a covering of varying composition to either or to both surfaces of the sheet are carried out in a single and continuously effected operation.

The apparatus does not comprise any knives and for this reason the selvages of the sheet are clean; in addition, there is no waste caused by the cut threads.

The longitudinal threads do not undergo any coating with adhesive material prior to the winding of the transverse spirals, the sheet of threads assembled without adhesive being conducted towards the other end of the machine called the "plastic station" by two layers of conveying fabric which hold the threads in position until the latter are coated by the plastic material for which they are to constitute the reinforcement.

The textile reinforcement thus formed may comprise more transverse threads per centimetre than the equivalent warp threads contained in a woven reinforcement, the unwoven threads being in juxtaposed relation and imparting a considerable resistance and dimensional stability to the reinforcement.

The simultaneous manufacture of the plastic sheet and its reinforcements enables a considerable economy to be achieved and in addition ensures a perfect cohesion between these two elements which is not always obtainable when using a non-woven reinforcement, the threads of which have been bonded beforehand by an adhesive substance having little compatibility with the plastic material of which the sheet is formed.

The pliable and reinforced plastic sheet thus obtained may be used either in replacing coated or impregnated fabrics in all their applications, or in replacing furnishing or clothing fabrics, by imparting to it an appearance or a feel determined by the application of a suitable external lining, or even as an element forming part of molded plastic materials.

It is of course to be understood that the embodiments described above and illustrated in the drawings have only been given by way of example and that the form, nature, disposition and mounting of their elements may be modified in any suitable way without thereby departing from the scope of the invention.

What I claim is:

1. A process for the manufacture, in a single operation, of a flexible sheet of laminated plastic material with a reinforcement having a bidirectional resistance, wherein the reinforcement is in the form of a sheet obtained by advancing longitudinal rovings or threads in the direction of their length along a guide surface formed at the inlet end substantially by the envelope of a circular cylinder and degenerating progressively towards the outlet end into the envelope of a substantially flattened cylinder conforming to a straight edge, the circumferential length at the outlet end being substantially equal to that at the inlet end, and by winding transverse rovings or threads in sinusoidal turns of variable pitch around the said longitudinal rovings or threads at a position where the longitudinal rovings or threads still follow a path formed substantially by the generatrices of the said circular cylinder.

2. A process according to claim 1, wherein the guide surface for the longitudinal rovings or threads is shaped in such manner as to cause a drawing or stretching of the turns or helices as the sheet formed of longitudinal and transverse threads is advanced, resulting in the displacement of said sinusoidal turns in relation to the longitudinal threads and their alignment into straight half turns.

3. A process according to claim 1, wherein the reinforcing sheet is conveyed by conveyor means so designed that the relative positions of the longitudinal and transverse threads forming said reinforcing sheet are maintained when the sheet is conveyed for subsequent treatments by a clamping action exerted by said conveying means.

4. A process according to claim 1, wherein the reinforcing sheet is conveyed by conveyor belts applied to the two surfaces of the sheet and travelling therewith.

5. A process according to claim 3, wherein the impregnation of the sheet of longitudinal and transverse threads with plastic or other material is effected through the means for conveying the said sheet.

6. A process according to claim 5, wherein the said conveying means is adapted to remain incorporated in the final product.

7. A process according to claim 5, wherein the conveying means is separated from the sheet after drying the impregnating material.

8. A process according to claim 7, wherein the texture of the conveying means serves to impart a graining to the two surfaces of the plastic sheet thus formed.

9. A process according to claim 3, wherein the impregnation of the sheet of longitudinal and transverse threads with the plastic material is effected after the said sheet has been separated from the conveying means.

10. A process according to claim 1, wherein the sheet of longitudinal and transverse threads is covered at least on one surface thereof with a sheet of solid thermoplastic material which is fixed on the reinforcing sheet.

11. A process according to claim 1, wherein the sheet of longitudinal and transverse threads is covered on both its surfaces, after impregnation with plastic material but before drying the latter, with an impermeable film resisting the drying of the plastic material and for this reason being adapted to be subsequently separated from the said sheet.

12. A process according to claim 1, wherein the sheet of longitudinal and transverse threads is covered, after impregnation with plastic material but before the drying of the latter, and on at least one surface thereof with layers or sheets, the said layers or sheets being incorporated in the plastic sheet by the drying of the impregnating plastic material.

13. A process according to claim 1, wherein the sheet of longitudinal and transverse threads is impregnated with plastic material and converted into a plastic sheet by drying the impregnating plastic material.

14. A process according to claim 1, wherein the longitudinal and transverse rovings or threads, the plastic material and the materials forming the external coverings of the plastic sheet are colored.

15. Apparatus for the manufacture of a lamination comprising a station for the formation of a reinforcing sheet constituted by a sheet of crossed threads, a station for impregnating the said sheet with plastic material, a drying station for the sheet of threads impregnated with plastic material, and conveying means for conveying the sheet sequentially through the stations; the station for forming the reinforcing sheet comprising a fixed guiding support having an outlet end and an inlet end with the shape of a circular cylinder progressively flattened towards the outlet end, the outlet end having substantially the form of a straight edge parallel to a plane containing the base of the circular cylinder at the inlet end, the width of the flattened outlet end being equal to half the circumference of said base, means operatively associated with the support by which selected of the threads are distributed around the said base and by which the said threads are drawn from said edge in the form of a sheet of parallel threads, means operatively associated with the support by which transverse threads are wound into sinusoidal turns around the parallel threads at a position in proximity to the base of the fixed guiding support, means operatively associated with the support by which the winding pitch of the sinusoidal turns is caused to vary, and means operatively associated with the support by which the tension of the transverse threads is varied and by which the sinusoidal turns wound close to the base of the said guiding support are transformed into straight and parallel half turns at the outlet end.

References Cited in the file of this patent

UNITED STATES PATENTS

| | | |
|---|---|---|
| 1,316,845 | Magnasco | Sept. 23, 1919 |
| 1,460,949 | Currier | July 3, 1923 |
| 1,753,806 | Ross | Apr. 8, 1930 |
| 1,843,322 | Haviland | Feb. 2, 1932 |
| 2,321,512 | Protz | June 8, 1943 |
| 2,696,243 | Holland | Dec. 7, 1954 |